(12) United States Patent
Muramatsu et al.

(10) Patent No.: US 12,195,988 B2
(45) Date of Patent: Jan. 14, 2025

(54) BUILDING

(71) Applicant: TOYOTA JIDOSHA KABUSHIKI KAISHA, Toyota (JP)

(72) Inventors: Nami Muramatsu, Kasugai (JP); Kunihiro Iwamoto, Nagakute (JP); Yuta Itozawa, Nagoya (JP); Hirotaka Komura, Setagaya-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 326 days.

(21) Appl. No.: 17/691,180

(22) Filed: Mar. 10, 2022

(65) Prior Publication Data

US 2022/0299997 A1  Sep. 22, 2022

(30) Foreign Application Priority Data

Mar. 16, 2021  (JP) .................. 2021-042168

(51) Int. Cl.
| | |
|---|---|
| *E04H 1/04* | (2006.01) |
| *A47L 9/28* | (2006.01) |
| *E04F 11/02* | (2006.01) |
| *E04F 11/022* | (2006.01) |

(52) U.S. Cl.
CPC .............. *E04H 1/04* (2013.01); *A47L 9/2852* (2013.01); *E04F 11/02* (2013.01); *A47L 2201/04* (2013.01); *E04F 11/0201* (2013.01); *E04F 11/022* (2013.01)

(58) Field of Classification Search
CPC ..... E04F 11/02; E04F 11/0201; E04F 11/022; E04F 11/06; E04H 1/04; E04H 1/06
USPC .................................................. 52/3
See application file for complete search history.

(56) References Cited

U.S. PATENT DOCUMENTS

| | | | | |
|---|---|---|---|---|
| 4,279,563 | A | * 7/1981 | Miller | G05D 1/0225 414/277 |
| 4,645,037 | A | * 2/1987 | Gomez | E04F 17/005 52/185 |
| 6,425,463 | B1 | * 7/2002 | Broyan | B66B 7/062 187/254 |
| 6,779,634 | B1 | * 8/2004 | Slagle | B66B 11/06 182/141 |
| 10,334,946 | B2 | * 7/2019 | Guivol | A47B 77/08 |
| 10,889,471 | B2 | * 1/2021 | Novacek | B66B 31/006 |
| 10,977,890 | B2 | * 4/2021 | Zhang | G07G 1/0072 |

(Continued)

FOREIGN PATENT DOCUMENTS

| | | |
|---|---|---|
| CN | 105347143 A | 2/2016 |
| JP | 2001-003534 A | 1/2001 |

(Continued)

*Primary Examiner* — Paola Agudelo
(74) *Attorney, Agent, or Firm* — Oliff PLC

(57) ABSTRACT

A staircase area at which a staircase is installed across a first floor and a second floor is provided in a building. A part of the staircase area is a non-installation space in which a staircase is not installed, and a lifting space through which a transport robot moves up and down between the first floor and the second floor is provided using the non-installation space. The lifting space and a staircase hall having a spandrel wall there between are adjacent to each other the second floor. An opening through which the transport robot moves between the lifting space and the staircase hall is provided in the spandrel wall.

4 Claims, 8 Drawing Sheets

(56) References Cited

U.S. PATENT DOCUMENTS

| | | | |
|---|---|---|---|
| 2006/0042883 A1* | 3/2006 | Scott | B66B 5/005 |
| | | | 187/351 |
| 2018/0170716 A1 | 6/2018 | Zhu et al. | |
| 2019/0323245 A1* | 10/2019 | Svensson-Hilford | ........................ |
| | | | E04F 17/005 |
| 2020/0231393 A1* | 7/2020 | Mercado | B66B 1/3446 |
| 2020/0332513 A1* | 10/2020 | Rubler | E04B 1/34869 |
| 2022/0106120 A1* | 4/2022 | Otsuki | B65G 1/1375 |
| 2022/0267091 A1* | 8/2022 | Ota | B66F 9/0755 |

FOREIGN PATENT DOCUMENTS

| | | |
|---|---|---|
| JP | 2004-060426 A | 2/2004 |
| JP | 2008-262261 A | 10/2008 |
| JP | 2013-014400 A | 1/2013 |

\* cited by examiner

FIG. 2A
FIG. 2B
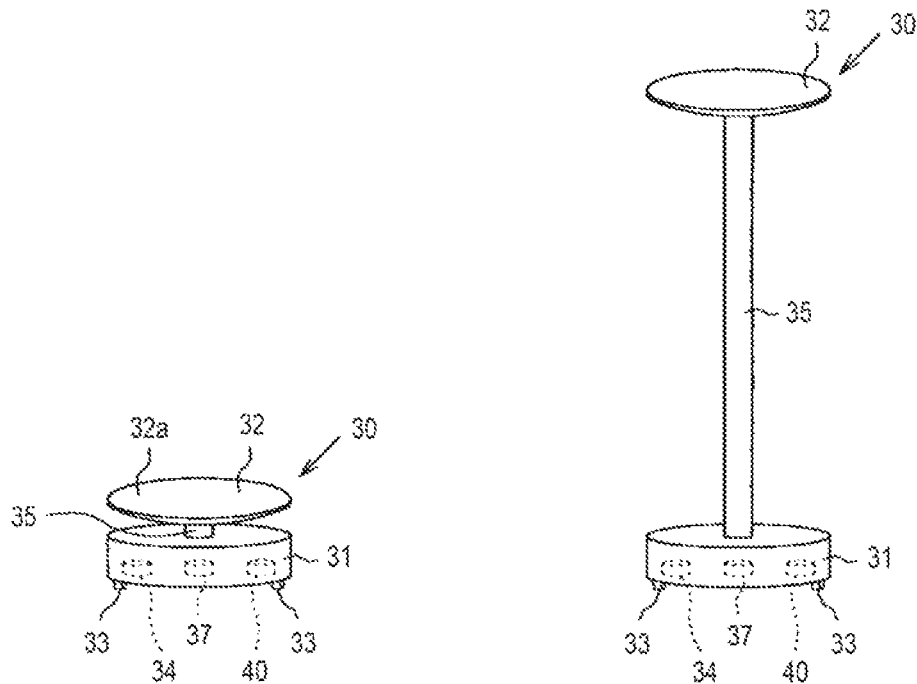
FIG. 3
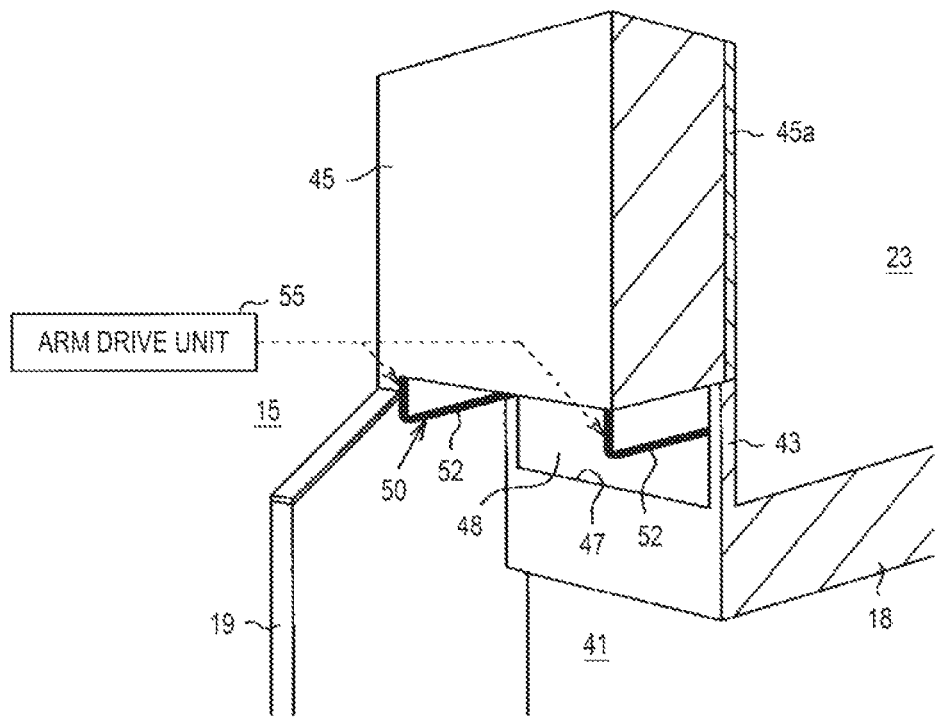

BUILDING

CROSS-REFERENCE TO RELATED APPLICATION

This application claims priority to Japanese Patent Application No. 2021-042168 filed on Mar. 16, 2021, incorporated herein by reference in its entirety.

BACKGROUND

1. Technical Field

The present disclosure relates to a building.

2. Description of Related Art

In recent years, a technology is known in which a self-driving robot traveling on the floor may be used in a building, such as a house. For example, Japanese Unexamined Patent Application Publication No. 2008-262261 (JP 2008-262261 A) discloses a building in which such a self-driving robot can move between a lower floor and an upper floor. An atrium space is provided across the lower floor and the upper floor in this building, and a pole extends across the lower floor and the upper floor in the atrium space. The robot autonomously travels along the pole, whereby it is capable of moving between the lower floor and the upper floor.

SUMMARY

However, it is necessary to provide a dedicated atrium space for the robot to move up and down between the lower and upper floors within the building disclosed in JP 2008-262261 A. Therefore, in-building planning may be restricted.

The present disclosure provides a building in which a traveling object can move up and down, while also reducing restrictions on the in-building planning.

A building according to an aspect of the present disclosure has a lower floor and an upper floor, which are adjacent to each other in a vertical direction, and to which a traveling object that travels on each of the lower floor and the upper floor to perform a specific work is used. The building includes a staircase area that is provided across the lower floor and the upper floor and in which a staircase which connects the lower floor and the upper floor is installed. A lifting space through which the traveling object moves up and down between the lower floor and the upper floor is provided using a non-installation space in which the staircase is not installed, in the staircase area. The upper floor is provided with an upper floor-adjacent space adjacent to the lifting space between which a partition wall exists. An opening through which the traveling object moves between the lifting space and the upper floor-adjacent space is provided in the partition wall.

With the above aspect, the staircase area is provided across the lower and upper floors within the building. The non-installation space in which the staircase is not installed, in the staircase area, is used for forming the lifting space of the traveling object. In this case, the traveling object can move up and down between the lower floor and the upper floor via the lifting space. The opening is provided in the partition wall between the lifting space and the upper floor-adjacent space, through which the traveling object can move between the lifting space and the upper floor-adjacent space. Therefore, the traveling object can move between each of the lower floor and the upper floor using the staircase area within the building. Consequently, it is not necessary to separately provide a dedicated lifting space (an atrium space) within the building for moving the traveling object up and down between the lower and upper floors. This configuration enables the traveling object to move up and down, while also reducing restrictions on the in-building planning.

In the above aspect, the traveling object may move up and down between the lower floor and the upper floor within the lifting space by a lifting unit. The building may include a supporter configured to support the traveling object and release supporting of the traveling object on the upper floor in the lifting space, and a moving mechanism configured to move the traveling object through the opening between the lifting space and the upper floor-adjacent space by operating the supporter while the supporter supports the traveling object.

With the above aspect, when the traveling object moves from the lower floor to the upper floor, the traveling object moves up by the lifting unit from the lower floor to the upper floor in the lifting space. Further, the traveling object is supported by the supporter of the moving mechanism on the upper floor while moving from the lifting space to the upper floor-adjacent space via the opening. Further, when the traveling object moves from the upper floor to the lower floor, it moves from the upper floor-adjacent space to the lifting space via the opening while being supported by the supporter. Further, the traveling object moves down from the upper floor to the lower floor by the lifting unit in the lifting space. When the traveling object moves down, it moves down after the support of the traveling body by the supporter is released.

With the above aspect, the traveling object can specifically move between the lower and upper floors using the lifting unit and the moving mechanism. For example, a moving mechanism may be provided in the building for moving the traveling object between the lower and upper floors (specifically, between the lower floor and the upper floor-adjacent space in the lifting space). However, in such a case, the moving mechanism may have an extremely complicated configuration. On the other hand, the configuration according to the present disclosure is one in which the traveling object moves up and down by the lifting unit between the lower floor and the upper floor in the lifting space, and moves by the moving mechanism between the lifting space and the upper floor-adjacent space on the upper floor, whereby the traveling object can move between the lower and upper floors without the moving mechanism having a complicated configuration.

The lifting unit may be provided on the traveling object in the form of a configuration described later, or may be provided on the building. Examples of the lifting unit provided on the building include a rod-shaped body, such as a pole extending vertically across the lower floor and the upper floor in the lifting space. In this case, the traveling object is configured to autonomously travel along the rod-shaped body, by which the traveling object can move up and down between the lower floor and the upper floor, as in the embodiments disclosed in JP 2008-262261 A.

In the above aspect, the traveling object may include the lifting unit which is configured to be extendable in the vertical direction, and move up and down between the lower floor and the upper floor as the lifting unit extends and contracts.

With the above aspect, when the traveling object moves from the lower floor to the upper floor, the traveling object extends from the lower floor to the upper floor in the lifting space, and is supported by the supporter on the upper floor when it is in an extended state. The traveling object contracts when it is supported by the supporter, and then the traveling object moves up from the lower floor to the upper floor. The traveling object moves from the lifting space to the upper floor-adjacent space while it is supported by the supporter.

Further, when the traveling object moves from the upper floor to the lower floor, the traveling object moves from the upper floor-adjacent space to the lifting space while it is supported by the supporter, and then, extends from the upper floor to the lower floor in the lifting space. The traveling object extends until it reaches a bottom floor of the lifting space (the lower floor) and is placed on the bottom floor. The traveling object is released from supporting of the supporter while it is placed on the bottom floor, and contracts to move down from the upper floor to the lower floor.

With the above aspect, the traveling object is configured to be extendable, whereby the traveling object moves up and down between the lower floor and the upper floor. Therefore, it is not necessary to provide the lifting unit on the building, thus the building only needs to have a simplified configuration. Since it is not necessary to provide the lifting unit in the lifting space, a resident does not experience inconvenience due to the lifting unit when they pass through the lifting space (and the staircase area).

In the above aspect, an overhang portion may be provided above the opening, to be closer to the lifting space than the partition wall, and the moving mechanism may be mounted on a lower surface of the overhang portion.

With the above aspect, the moving mechanism is mounted on the lower surface of the overhang portion protruding toward the lifting space. Accordingly, the moving mechanism can be stably mounted via the overhang portion, and can be appropriately hidden behind the overhang portion.

In the above aspect, the traveling object may include a pair of protrusions, laterally projecting to opposite sides of each other. The moving mechanism may include, as the supporter, a pair of movable arms configured to support the traveling object by respectively being hooked on the protrusions of the traveling object. The arms may approach each other so as to be respectively hooked on the protrusions such that the arms support the traveling object, and separate from each other to release from the protrusion such that the arms release supporting of the traveling object.

With the above aspect, the pair of arms are respectively hooked on to the protrusions of the traveling object such that the traveling object is supported by the pair of arms. Since the traveling object is supported from both sides by the pair of arms, it can be stably supported. In the configuration in which the traveling object is supported by the pair of arms being hooked on specific structures, the traveling object can be stably supported even if a position of the traveling object varies slightly as compared to a configuration in which, for example, the traveling object is sandwiched and supported by the pair of arms. Therefore, it is possible to support the traveling object stably and firmly.

In the above aspect, the traveling object may be a transport robot that transports an object. The transport robot may include a main body configured to travel on the floor, a mounting portion that is provided above the main body and on which the object is placed, and a pillar configured to connect the main body and the mounting portion. The pillar may be extendable in the vertical direction. The transport robot may include the lifting unit configured to move up and down between the lower floor and the upper floor as the pillar extends and contracts. The mounting portion may protrude on both sides of the pillar, and protruding portions of the mounting portion may respectively correspond to the protrusions on which the arms are hooked.

With the above aspect, the traveling object is the transport robot that transports the object. The transport robot has a structure in which the main body travels on the floor, the mounting portion has the object placed thereon, and the extendable pillar connects the main body and the mounting portion, and the transport robot can move up and down between the lower floor and the upper floor as the pillar extends and contracts. Consequently, the transport robot can achieve the same advantageous effects as in the disclosure stated above. The mounting portion protrudes on both sides of the pillar, and the protruding portions of the mounting portion serve as the protrusions on which the arms are hooked to support the traveling object (the transport robot). In this case, the mounting portion can be used not only for mounting the object but also as a portion on which the arms are hooked.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2A is a perspective view illustrating a transport robot and illustrating a normal state where a pillar of the transport robot contracts;

FIG. 2B is a perspective view illustrating the transport robot and illustrating an extended state where the pillar is extended;

FIG. 3 is a perspective view of a periphery of a storage as viewed from a staircase area;

DETAILED DESCRIPTION OF EMBODIMENTS

Figure 1:
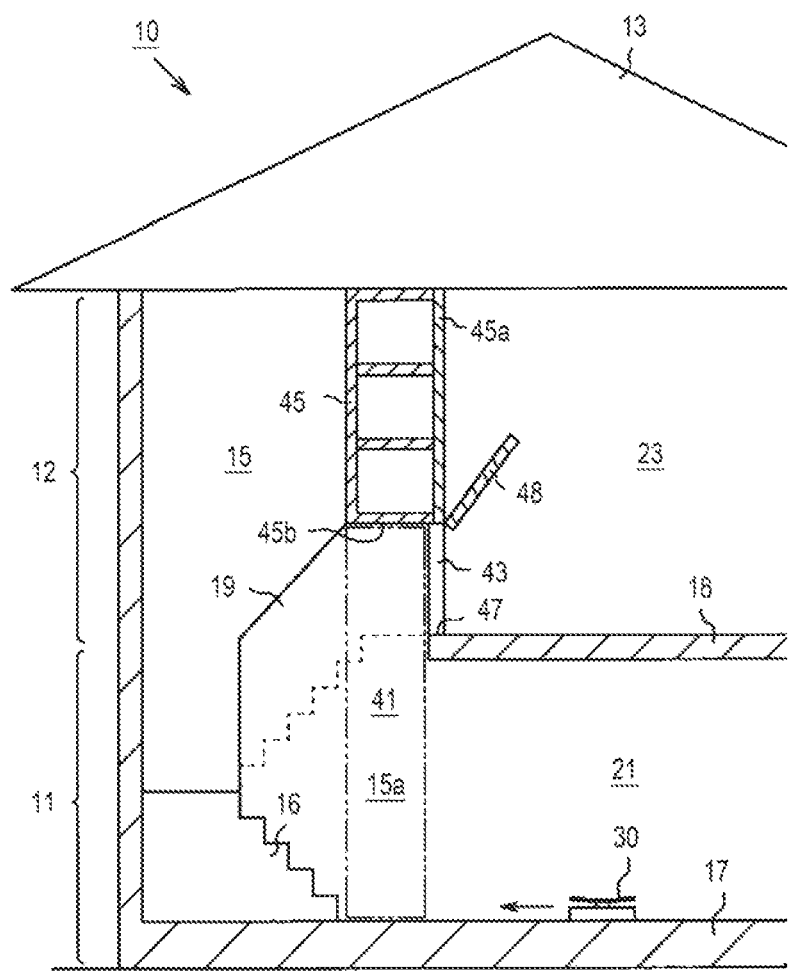
FIG. 1 is a schematic cross-sectional view illustrating an outline of a building.

Hereinafter, one embodiment of the present disclosure will be described with reference to drawings. FIG. 1 is a schematic cross-sectional view illustrating an outline of the building according to the present embodiment.

As illustrated in FIG. 1, a building 10, such as a house, is a two-story building having a first floor 11 (corresponding to the lower floor) and a second floor 12 (corresponding to the upper floor). A roof 13 is provided above the second floor 12, and the roof 13 is, for example, a gable roof.

A staircase area 15 is provided across the first floor 11 and the second floor 12 in the building 10. The staircase area 15 is an atrium space opening from the first floor 11 to the second floor 12, of which a floor surface is formed by a flooring 17 of the first floor 11, and a top surface is formed by a ceiling of the second floor 12. A staircase 16 which is a winder staircase is installed in the staircase area 15. A person can move up and down between the first floor 11 and the second floor 12 via the staircase 16. A lower portion and an upper portion of the staircase 16 are partitioned by a diagonal adjoining wall 19.

A hallway 21 is provided such that it is connected to the staircase area 15 on the first floor 11. Although not shown, a living room space ("a first living room") including a drawing room or a dining room is provided on the first floor 11, and the hallway 21 leads to this living room space. The flooring 17 of the first floor 11 (hereinafter also referred to as a "first flooring 17") has the same floor height over the entire area thereof.

A staircase hall 23 is provided such that it is connected to the staircase area 15 on the second floor 12. Although not shown, a living room space ("a second living room") including a bedroom is provided on the second floor 12, and the staircase hall 23 leads to this living room space. A flooring 18 of the second floor 12 (hereinafter also referred to as a "second flooring 18") has the same floor height over the entire area thereof.

The building 10 is provided with a transport robot 30 that travels on the floorings 17, 18 to transport objects. A configuration of the transport robot 30 will be described hereinbelow with reference to FIGS. 2A and 2B. FIGS. 2A and 2B are perspective views illustrating the transport robot 30, in which FIG. 2A illustrates a normal state where a pillar 35 of the transport robot 30 is contracted, and FIG. 2B illustrates an extended state where the pillar 35 is extended. The transport robot 30 corresponds to the "traveling object" in which transport is the specific work.

As illustrated in FIGS. 2A and 2B, the transport robot 30 has a main body 31 that travels on the floorings 17, 18, a mounting portion 32 that is provided above the main body 31 and on which the object is placed, and a pillar 35 that vertically connects the main body 31 and the mounting portion 32. The main body 31 is formed in a flat circular shape, and a plurality of wheels 33 are attached to a lower portion of the main body 31. The main body 31 has a built-in traveling drive unit 34, such as a motor, which serves as a driving source while the transport robot 30 travels. The wheels 33 are rotated by the traveling drive unit 34, and the main body 31 and the transport robot 30 travel on the floorings 17, 18.

The mounting portion 32 is formed in a circular dish shape, and its outer diameter is substantially the same as the outer diameter of the main body 31. In the transport robot 30, the main body 31 can autonomously (self-driving) travel on the floorings 17, 18 with the object placed on the mounting portion 32 to transport the object to somewhere in the building 10. The mounting portion 32 does not necessarily have to have a dish shape, and can have any shape, such as a plate or a box, as long as the object can be placed thereon.

The pillar 35 has a columnar shape extending vertically across the main body 31 and the mounting portion 32, and connects a center of the main body 31 and a center of the mounting portion 32. In this case, a part of the mounting portion 32 that protrudes laterally from an outer peripheral surface of the pillar 35 is a flange portion 32a.

The pillar 35 is configured to be extendable in a vertical direction. The pillar 35 is configured to have, for example, a plurality of tubular portions having different diameters. The pillar 35 contracts when one of adjacent tubular portions is housed in the other, and extends when one is removed from the other. As will be described later, the pillar 35 of the transport robot 30 is extendable in the staircase area 15 (in particular, a lifting space 41), and thus the transport robot 30 can move up and down between the first floor 11 and the second floor 12. That is, the transport robot 30 has a lifting unit capable of moving up and down between the first floor 11 and the second floor 12.

The transport robot 30 can be shifted between a normal state where the pillar 35 contracts (as illustrated in FIG. 2A) and an extended state where the pillar 35 extends (as illustrated in FIG. 2B). The transport robot 30 travels in the normal state when traveling on the floorings 17, 18. In the extended state, the transport robot 30 has a height larger than a vertical distance between a floor surface of the first flooring 17 and a floor surface of the second flooring 18. Consequently, the transport robot 30 is designed such that at least the mounting portion 32 is located at a position higher than the floor surface of the second flooring 18 when the transport robot 30 is in the extended state while the transport robot 30 is placed on the first flooring 17 in the staircase area 15.

The transport robot 30 is provided with an extension drive unit 37 such as a motor, which serves as a drive source for extending and contracting the pillar 35. The extension drive unit 37 is built in, for example, the main body 31. The pillar 35 and thus the transport robot 30 contract in the vertical direction as driven by the extension drive unit 37.

The transport robot 30 is provided with a robot control unit 40 that controls driving of the traveling drive unit 34 and the extension drive unit 37. The robot control unit 40 is built in, for example, the main body 31. The traveling drive unit 34 is controlled by the robot control unit 40 such that the transport robot 30 travels on the floorings 17, 18. The extension drive unit 37 is controlled by the robot control unit 40 such that the transport robot 30 extends and contracts in the vertical direction.

The transport robot 30 has a built-in microphone (not shown) that acquires a transport instruction by voice of a resident. The robot control unit 40 determines a travel route of the transport robot 30 based on the transport instruction acquired from the resident, and controls the drive units 34, 37 based on the determined travel route to control traveling of the transport robot 30. The robot control unit 40 has a memory that stores floor plan information of the building 10, and controls traveling of the transport robot 30 with reference to the floor plan information stored in the memory.

A configuration for moving the transport robot 30 between the first flooring 17 and the second flooring 18 will be described hereinbelow with reference to FIG. 1.

As illustrated in FIG. 1, the staircase area 15 is a non-installation space 15a in which the staircase 16 is not installed. A part of the non-installation space 15a is a lifting space 41 for moving the transport robot 30 up and down between the first floor 11 and the second floor 12. The lifting space 41 extends from the floor surface of the first flooring 17 to a position higher than the floor surface of the second flooring 18, in which an outer edge of the lifting space 41 is denoted by a rectangular frame surrounded by a dashed-two dotted line in FIG. 1 to facilitate a better understanding.

The lifting space 41 and the staircase hall 23 are adjacent to each other on the second floor 12. In the building 10, the staircase hall 23 is used as a storage space for miscellaneous items such as cardboard boxes, for example, and the transport robot 30 is to transport the items placed in the staircase hall 23. The staircase hall 23 corresponds to the upper floor-adjacent space. A spandrel wall 43 is provided between the lifting space 41 and the staircase hall 23 as a partition wall that separates these two spaces 23, 41. The spandrel wall 43 is provided so as to rise upward from a floor surface of the staircase hall 23.

Figure 4A:
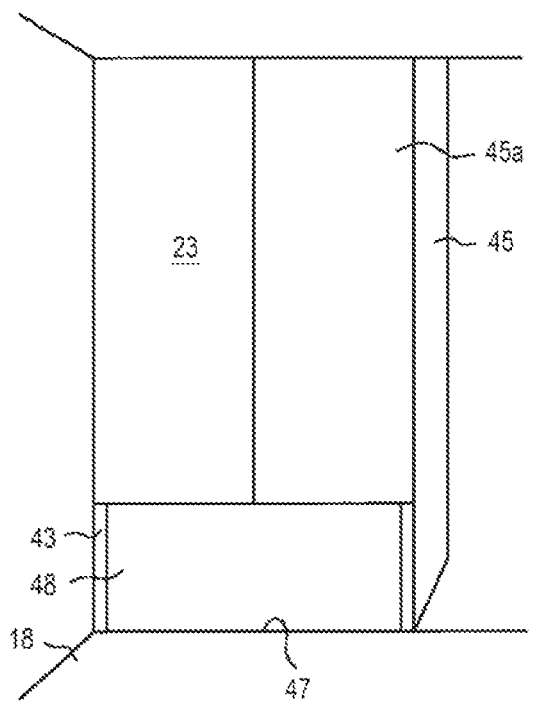
FIG. 4A is a perspective view of the periphery of the storage as viewed from a staircase hall, illustrating a state where a swinging door is closed.
Figure 4B:
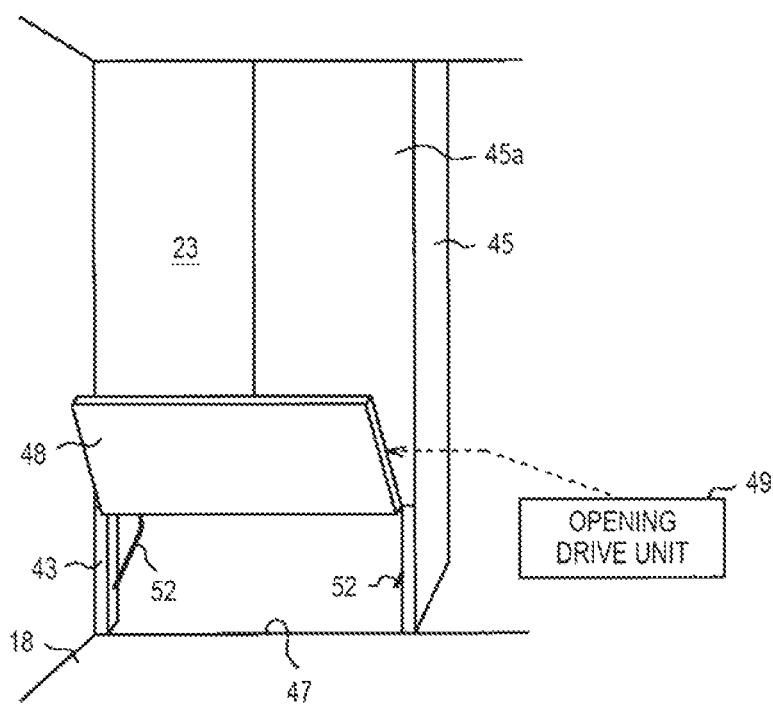
FIG. 4B is a perspective view of the periphery of the storage as viewed from a staircase hall, illustrating a state where the swinging door is open.

A storage 45 capable of storing objects is provided above the spandrel wall 43. A configuration around the storage 45 will be described hereinbelow with reference to FIGS. 3, 4A, and 4B as well as FIG. 1. FIG. 3 is a perspective view of a periphery of the storage 45 as viewed from the staircase area 15. FIGS. 4A and 4B are perspective views of the periphery of the storage 45 as viewed from the staircase hall 23. FIG. 4A illustrates a state where a swinging door 48 is closed, and FIG. 4B illustrates a state wherein the swinging door 48 is opened.

As illustrated in FIGS. 1, 3, 4A, and 4B, the storage 45 is a storage rack formed in a cuboid shape, and is provided across a top end of the spandrel wall 43 and a top surface of the staircase hall 23. The storage 45 has a double door 45a, and it is possible to open the door 45a and take the objects in and out of the staircase hall 23. The storage 45 is provided so as to protrude from the spandrel wall 43 on a side of the staircase area 15 (a side of the lifting space 41). Consequently, the lifting space 41 is provided as a space covering from the floor surface of the first flooring 17 to a lower surface 45b of the storage 45. The storage 45 corresponds to the overhang portion.

The spandrel wall 43 is provided with a rectangular opening 47 that connects the lifting space 41 and the staircase hall 23. The opening 47 is formed to cover a vertical range extending from the floor surface of the staircase hall 23 to the lower surface 45b of the storage 45. The transport robot 30 can move between the lifting space 41 and the staircase hall 23 via the opening 47.

The spandrel wall 43 is provided with the swinging door 48 that opens and closes the opening 47. The swinging door 48 is formed as a rectangular plate, and is rotatably attached to the spandrel wall 43 at a top end. In particular, the swinging door 48 is rotatably attached to both side portions of the spandrel wall 43 sandwiching the opening 47. Consequently, the opening 47 is opened and closed as the swinging door 48 is rotated. The swinging door 48 is normally closed, but in FIG. 1, it is opened to facilitate a better understanding. The swinging door 48 is driven to be opened or closed by an opening drive unit 49 including, for example, an electric motor.

Figure 5C:
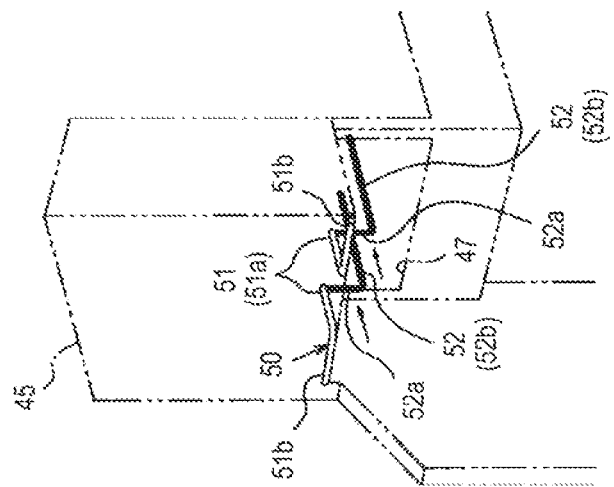
FIG. 5C is a perspective view illustrating a moving mechanism and a case where the arms are in a third position.
Figure 5B:
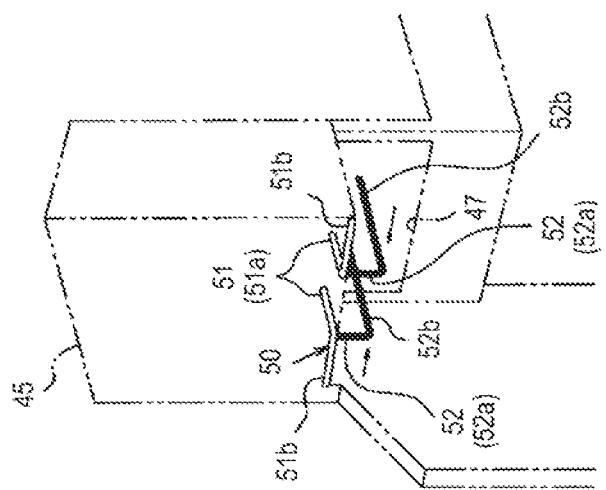
FIG. 5B is a perspective view illustrating a moving mechanism and a case where the arms are in a second position.
Figure 5A:
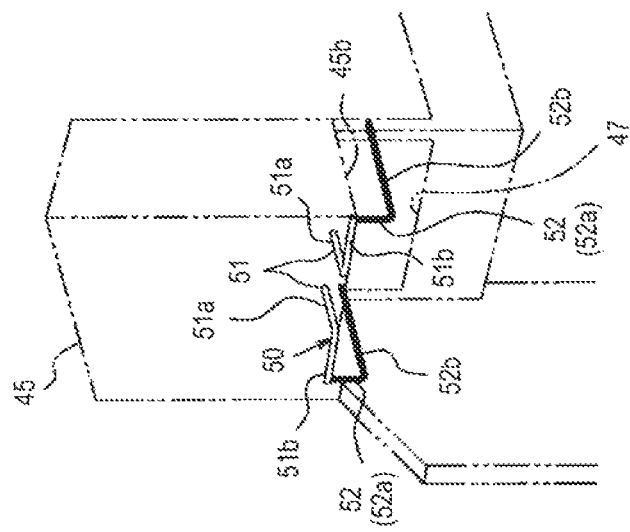
FIG. 5A is a perspective view illustrating a moving mechanism and a case where arms of the moving mechanism are in a first position.

The lower surface 45b of the storage 45 is provided with a moving mechanism 50 which moves the transport robot 30 between the lifting space 41 and the staircase hall 23 via the opening 47. Therefore, the moving mechanism 50 will be described hereinbelow with reference to FIGS. 5A to 5C. FIGS. 5A to 5C are perspective views illustrating the moving mechanism 50. FIG. 5A illustrates a case where arms 52 of the moving mechanism 50 are in a first position. FIG. 5B illustrates a case where the arms 52 are in a second position. FIG. 5C illustrates a case where the arms 52 are in a third position. Each part other than the moving mechanism 50 (such as the storage 45) is denoted by dashed-two dotted lines in FIGS. 5A to 5C to facilitate a better understanding.

As illustrated in FIGS. 5A to 5C, the moving mechanism 50 includes a pair of guide rails 51 attached to the lower surface 45b of the storage 45 and a pair of arms 52 provided to be guided by the guide rails 51. Each guide rail 51 extends in an L-shape along the lower surface 45b of the storage 45, and is disposed apart from the other guide rail in a width direction of the opening 47. Each guide rail 51 has a first rail portion 51a extending in an opening direction of the opening 47 (in other words, a thickness direction of the spandrel wall 43), and a second rail portion 51b extending from an end of the first rail portion 51a on a side opposite to the opening 47 toward a side spacing apart in the width direction of the opening 47.

Each arm 52 is a supporter for supporting the transport robot 30. The moving mechanism 50 moves the transport robot 30 by moving the arms 52 along the guide rails 51 while the transport robot 30 is supported by the arms 52, whereby the transport robot 30 moves between the lifting space 41 and the staircase hall 23. Each arm 52 is made of an L-shaped rod material, and is attached to and suspended from each guide rail 51.

Each arm 52 has an attachment portion 52a extending in the vertical direction and having a top end attached to the guide rail 51, and a supporting portion 52b extending from a lower end of the attachment portion 52a to a side of the opening 47 and supporting the transport robot 30. The attachment portion 52a is slidable along the guide rail 51 while it is attached to the guide rail 51, and thus the arms 52 can move along the guide rails 51. In this case, each arm 52 moves in parallel along the guide rail 51 without changing its direction. The supporting portions 52b of the arms 52 are arranged in parallel with each other.

Each arm 52 can move between the first position located at a free end of the second rail portion 51b (the position as illustrated in FIG. 5A), the second position located at a boundary between the first rail portion 51a and the second rail portion 51b (the position as illustrated in FIG. 5B), and the third position located at a free end of the first rail portion 51a (the position as illustrated in FIG. 5C), along the guide rail 51.

When the arms 52 move from the first position to the second position, the arms 52 approach each other in the width direction of the opening 47. Consequently, in a case where the arms 52 are located at the second position, a distance between the arms 52 is smaller, i.e., the arms are close to each other (see FIGS. 8B and 8F). Meanwhile, when the arms 52 move from the second position to the first position, the arms 52 are separated from each other in the width direction of the opening 47. Consequently, in a case where the arms 52 are located at the first position, a distance between the arms 52 is larger, i.e., the arms are spaced apart (see FIGS. 8A and 8G).

When the arms are close to each other, the distance between the arms 52 is smaller than an outer diameter of the mounting portion 32 of the transport robot 30. Therefore, when the arms are close to each other, the transport robot 30 can be supported by hooking the supporting portions 52b of the arms 52 on the flange portion 32a of the mounting portion 32 (see FIGS. 8B and 8F). Further, the arms 52 are hooked on the flange portion 32a of the mounting portion 32 on both sides of the pillar 35. In this case, the arms 52 are respectively hooked on portions of the flange portion 32a which protrude on both sides of the pillar 35. These protruding portions correspond to the "protrusions". On the other hand, when the arms are spaced apart (that is, the first position) the distance between the arms 52 is larger than the outer diameter of the mounting portion 32. Therefore, when the arms are spaced apart, the arms 52 are released from the mounting portion 32 (see FIGS. 8A and 8G).

As stated above, the arms 52 are spaced apart or are close to each other by the arms 52 being moved between the first position and the second position. In a case where the transport robot 30 is in the extended state in the lifting space 41, when the arms 52 were spaced apart but now close together, the arms 52 are hooked on the flange portion 32a of the mounting portion 32 to support the transport robot 30. When the arms 52 were close together but are now spaced apart, the arms 52 are released from the flange portion 32a to release supporting of the transport robot 30.

Figure 8A:
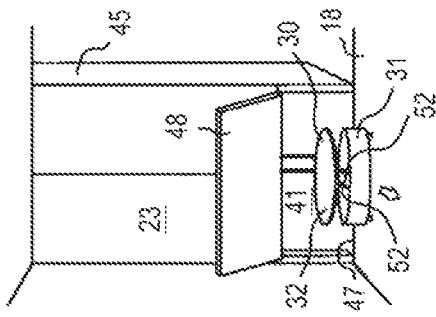
FIG. 8A is a diagram illustrating how the transport robot moves between a lifting space and the staircase hall by the arms.
Figure 8B:
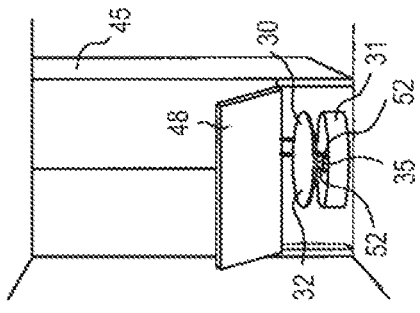
FIG. 8B is a diagram illustrating how the transport robot moves between a lifting space and the staircase hall by the arms.
Figure 8C:
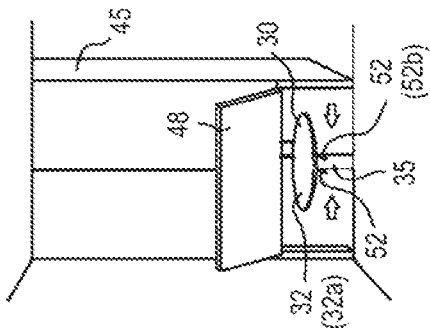
FIG. 8C is a diagram illustrating how the transport robot moves between a lifting space and the staircase hall by the arms.
Figure 8D:
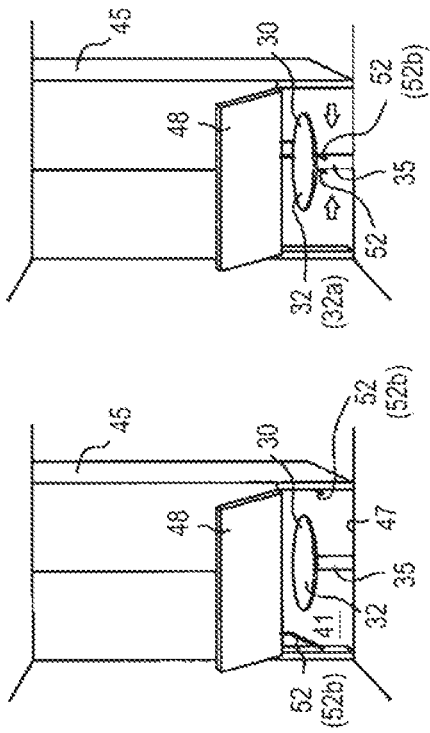
FIG. 8D is a diagram illustrating how the transport robot moves between a lifting space and the staircase hall by the arms.
Figure 8E:
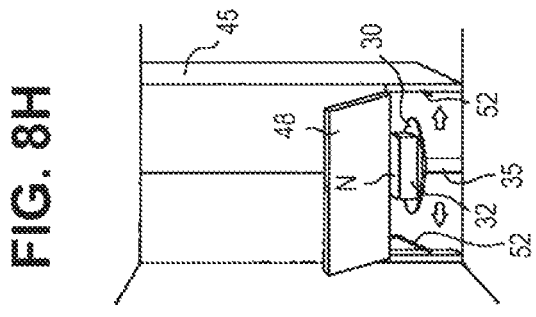
FIG. 8E is a diagram illustrating how the transport robot moves between a lifting space and the staircase hall by the arms.

In a case where the arms 52 are located at the third position, they are located closer to the opening 47 than when the arms 52 are located at the second position (see FIGS. 8D and 8E). When the arms 52 move between the second position and the third position, the arms 52 move in the opening direction of the opening 47 while keeping the distance between the arms 52, that is, while the arms are close to each other. Consequently, the arms 52 can move between the second position and the third position while engaging with the transport robot 30, whereby the transport robot 30 can move up and down between the lifting space 41 and the staircase hall 23 via the opening 47 (see FIGS. 8C to 8F).

Moreover, the arms 52 generally stop at the first position. Accordingly, the first position can be referred to as a stand-by position of the arm 52.

The arms 52 move along the guide rails 51 as driven by an arm drive unit 55 including an electric motor. The arm drive unit 55 is provided, for example, on a side of the lower surface 45b of the storage 45.

Figure 6:
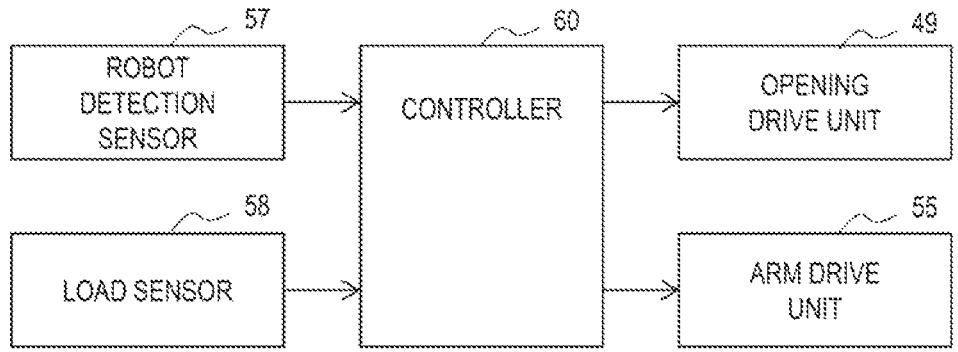
FIG. 6 is a diagram illustrating an electrical configuration of a control system that controls movement of the arms.

A control system that controls the movement of the arms 52 will be described hereinbelow with reference to FIG. 6. FIG. 6 is a diagram illustrating an electrical configuration of the control system that controls the movement of the arms 52.

As illustrated in FIG. 6, the building 10 is provided with a controller 60 that controls the movement of the arms 52. The controller 60 is configured to include a well-known microcomputer having, for example, a CPU, and is provided, for example, on a wall surface of the staircase hall 23. A robot detection sensor 57 and a load sensor 58 are connected to the controller 60. The robot detection sensor 57 is a sensor that detects whether there is the transport robot 30 around the arms 52, and is attached to, for example, the attachment portion 52a of the arm 52. The load sensor 58 is a sensor that detects a downward load acting on the arm 52, and is attached to, for example, the guide rail 51 that supports the arm 52. The detection results of the sensors 57, 58 are sequentially output from each of the sensors 57 and 58 to the controller 60.

The opening drive unit 49 and the arm drive unit 55 are connected to the controller 60. The controller 60 controls opening/closing of the swinging door 48 by the opening drive unit 49 and the movement of the arms 52 by the arm drive unit 55 based on the detection results obtained from the robot detection sensor 57 and the load sensor 58.

An arm control process executed by the controller 60 will be described hereinbelow with reference to the flowchart illustrated in FIG. 7. It is assumed that a resident (for example, an elderly person), who is in a living room on the first floor 11, issues a transport instruction to the transport robot 30 such that it transports a cardboard box N placed in the staircase hall 23 of the second floor 12 to the living room, and the robot control unit 40 controls the movement of the transport robot 30 based on the transport instruction. The arm control process executed by the controller 60 will be described hereinbelow, referring to a movement flow of the transport robot 30. The arm control process is repeatedly executed at a predetermined cycle. FIGS. 8A to 8H illustrate how the transport robot 30 moves between the lifting space 41 and the staircase hall 23 using the arms 52, and the following description will be appropriately made with reference to FIGS. 8A to 8H.

The robot control unit 40 of the transport robot 30 determines a travel route of the transport robot 30 based on the transport instruction issued by the resident. As a travel route of the transport robot 30, the transport robot 30 is determined to move in order of living room (room where the resident is present) hallway 21 lifting space 41 staircase hall 23 (where the cardboard box N is placed) lifting space 41 hallway living room. The robot control unit 40 controls the movement of the transport robot 30 based on the determined travel route.

First, the transport robot 30 travels on the first flooring 17 and moves from the living room to the lifting space 41 through the hallway 21. When the transport robot 30 reaches the lifting space 41, it is shifted to the extended state by extending the pillar 35. Accordingly, the mounting portion 32 of the transport robot 30 rises to the second floor 12 in the lifting space 41 (see FIG. 8A). In the extended state, the transport robot 30 is located between the arms 52 on the second floor 12. At this time, the arms 52 are located at the first position (the stand-by position).

Figure 7:
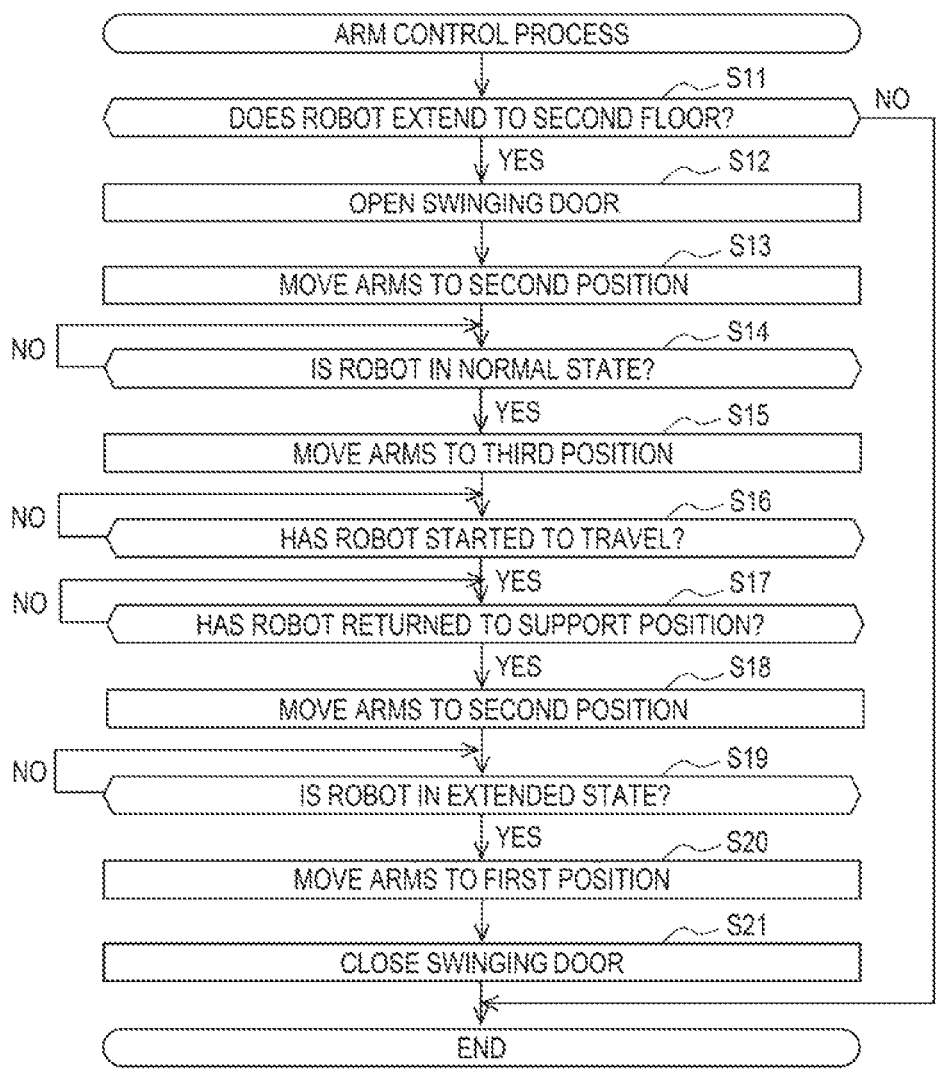
FIG. 7 is a flowchart illustrating an arm control process.

In the arm control process, as illustrated in FIG. 7, it is determined in step S11 whether the transport robot 30 is in the extended state (as illustrated in FIG. 2B) in the lifting space 41. This determination is made based on the detection result obtained from the robot detection sensor 57. That is, in a case where the robot detection sensor 57 detects that the transport robot 30 is present around the arms 52, it can be interpreted that the transport robot 30 is in the extended state and the mounting portion 32 is present in the vicinity of the arms 52. Therefore, it is determined that the transport robot 30 is in the extended state. In this case, the process proceeds to step S12. On the other hand, in a case where the robot detection sensor 57 does not detect that the transport robot 30 is present around the arms 52, it can be interpreted that the transport robot 30 in the extended state is not present in the lifting space 41. Therefore, it is determined as "NO" in step S11 and the process ends.

In step S12, the opening drive unit 49 is driven to open the swinging door 48. Accordingly, the opening 47 is opened as illustrated in FIG. 8A.

In the following step S13, the arms 52 move from the first position to the second position as driven by the arm drive unit 55. Consequently, as illustrated in FIG. 8B, the arms 52 are close to each other and are hooked on the flange portion 32a of the mounting portion 32 of the transport robot 30. The transport robot 30 is hooked on to and supported by the arms 52.

When the transport robot 30 is supported by the arms 52, the transport robot 30 shifts from the extended state to the normal state (as illustrated in FIG. 2A). For example, the transport robot 30 has a built-in arm sensor that detects that the arms 52 have approached, and the robot control unit 40 determines that the transport robot 30 is supported by the arms 52 based on the detection result obtained from the arm sensor, which illustrates that the arms 52 have approached. The robot control unit 40 shifts the transport robot 30 from the extended state to the normal state based on the determination. As illustrated in FIG. 8C, the transport robot 30 contracts while engaging with the arms 52, whereby the entire transport robot 30 rises to the second floor 12.

In the following step S14, it is determined whether the transport robot 30 has shifted from the extended state to the normal state. This determination is made based on the detection result obtained from the load sensor 58. In a case where the transport robot 30 is in the extended state, the transport robot 30 is placed on the first flooring 17, thus the downward load from the transport robot 30 does not significantly act on the arms 52. Meanwhile, in a case where the transport robot 30 starts to contract, shifting from the extended state to the normal state, the transport robot 30 rises up and is separated from the first flooring 17, thus the downward load from the transport robot 30 significantly acts on the arms 52. Therefore, in this step, it is determined that the transport robot 30 has started to contract, thereby shifting to the normal state, in a case where the load detected by the load sensor 58 becomes larger. When a predetermined time has elapsed from such a determination, it is determined that the transport robot 30 has shifted to the normal state. In this case, the predetermined time is set to a time equal to or longer than a time required for the transport robot 30 to shift from the extended state to the normal state. In a case where the transport robot 30 has shifted to the normal state, the process proceeds to step S15. In a case where the transport robot 30 has not shifted to the normal state, the determination is repeatedly made until the transport robot 30 shifts to the normal state.

In step S15, the arms 52 move from the second position to the third position as driven by the arm drive unit 55. Consequently, as illustrated in FIG. 8D, the transport robot 30 supported by the arms 52 moves from the lifting space 41 to the staircase hall 23 via the opening 47. In this case, the transport robot 30 is placed on the flooring 18 of the staircase hall 23.

The transport robot 30 starts to travel when it is placed on the flooring 18 of the staircase hall 23. In step S16, it is determined whether the transport robot 30 has started to travel on the flooring 18. This determination is made based on the detection result obtained from the load sensor 58. When the transport robot 30 starts to travel, the downward load from the transport robot 30 does not act on the arms 52. In this step, it is determined that the transport robot 30 has started to travel in a case where the load is no longer detected by the load sensor 58. In a case where the transport robot 30 has started to travel, the process proceeds to step S17. In a case where the transport robot 30 has not started to travel, the determination is repeatedly made until the transport robot 30 starts to travel. In a case where the transport robot 30 has started to travel, the arms 52 stand by at the third position.

When the transport robot 30 starts to travel, it moves to the storage space of the staircase hall 23 and receives the cardboard box N placed therein. For example, a transfer device for moving the object is in the storage space, and when the transport robot 30 moves to the storage space, the transfer device automatically puts the cardboard box N on the mounting portion 32. When the transport robot 30 receives the cardboard box N, it returns to a support position where it is supported by the arms 52 again, as illustrated in FIG. 8E.

In step S17, it is determined whether the transport robot 30 has returned to the support position in which it is supported by the arms 52. This determination is made based on the detection result obtained from the load sensor 58. When the transport robot 30 returns to the support position, the downward load from the transport robot 30 acts on the arms 52. In this step, it is determined that the transport robot 30 has returned to the support position in a case where the load is detected by the load sensor 58. In a case where the transport robot 30 has returned to the support position in which it is supported by the arms 52, the process proceeds to step S18. In a case where the transport robot 30 has not returned to the support position, the determination is repeatedly made until the transport robot 30 returns to the support position.

Figure 8F:
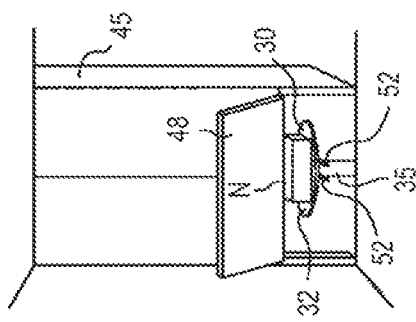
FIG. 8F is a diagram illustrating how the transport robot moves between a lifting space and the staircase hall by the arms.

In step S18, the arms 52 move from the third position to the second position as driven by the arm drive unit 55. Consequently, as illustrated in FIG. 8F, the transport robot 30 supported by the arms 52 moves from the staircase hall 23 to the lifting space 41 via the opening 47.

Figure 8G:
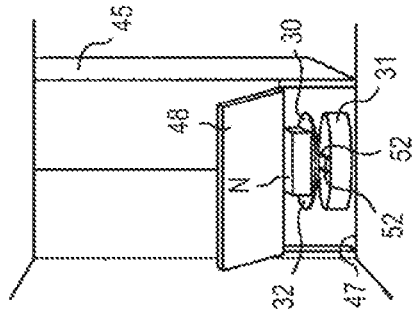
FIG. 8G is a diagram illustrating how the transport robot moves between a lifting space and the staircase hall by the arms.

When the transport robot 30 moves to the lifting space 41, it shifts from the normal state to the extended state. As illustrated in FIG. 8G, the main body 31 descends from the second floor 12 to the first floor 11 while the transport robot 30 is supported by the arms 52. The main body 31 is then placed on the first flooring 17.

In step S19, it is determined whether the transport robot 30 has shifted from the normal state to the extended state. This determination is made based on the detection result obtained from the load sensor 58. In a case where the transport robot 30 has shifted to the extended state, that is, the main body 31 is placed on the first flooring 17 and the load detected by the load sensor 58 becomes small, the process proceeds to step S20. On the other hand, in a case where the transport robot 30 has not shifted to the extended state, the determination is repeatedly made until the transport robot 30 shifts to the extended state.

Figure 8H:
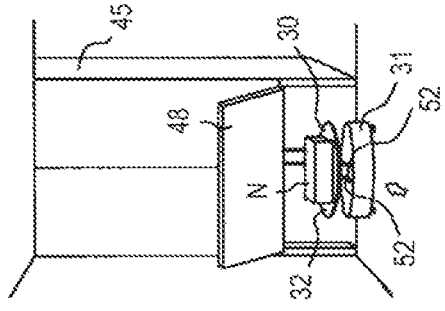
FIG. 8H is a diagram illustrating how the transport robot moves between a lifting space and the staircase hall by the arms.

In step S20, the arms 52 move from the second position to the first position as driven by the arm drive unit 55. Consequently, as illustrated in FIG. 8H, the arms 52 are spaced apart and release supporting of the flange portion 32a of the mounting portion 32 of the transport robot 30. That is, the transport robot 30 is released from being supported by the arms 52. Therefore, the transport robot 30 stands on the first flooring 17 in the extended state.

In step S21, the opening drive unit 49 is driven to close the swinging door 48. Consequently, the opening 47 is closed. The process is then terminated.

The transport robot 30 shifts from the extended state to the normal state. Accordingly, the transport robot 30 descends from the second floor 12 to the first floor 11 in the lifting space 41. The transport robot 30 then travels on the first flooring 17 to move from the lifting space 41 to the living room where the resident is present through the hallway 21, whereby the cardboard box N is transported to the resident using the transport robot 30.

According to the configuration of the present embodiment described in detail above, the following advantageous effects can be obtained.

The lifting space 41 of the transport robot 30 is provided using the non-installation space 15a in which the staircase 16 is not installed in the staircase area 15 extending across the first floor 11 and the second floor 12. The transport robot 30 moves up and down between the first floor 11 and the second floor 12 in the lifting space 41. The opening 47 is provided in the spandrel wall 43 partitioning the lifting space 41 and the staircase hall 23 on the second floor 12. The transport robot 30 moves between the lifting space 41 and the staircase hall 23 via the opening 47. Accordingly, the transport robot 30 can move between the first flooring 17 and the second flooring 18 using the staircase area 15 within the building 10. Consequently, it is not necessary to separately provide a dedicated lifting space (the atrium space) within the building 10 for moving the transport robot 30 up and down between the first floor 11 and the second floor 12. Thus, it is possible to move the transport robot 30 between the first floor 11 and the second floor 12 while reducing restrictions on the in-building planning for the building 10.

The transport robot 30 moves up and down between the first floor 11 and the second floor 12 in the lifting space 41 using its extension function (the lifting unit), and moves between the lifting space 41 and the staircase hall 23 using the moving mechanism 50 on the second floor 12. For example, the moving mechanism may be provided in the building 10 for moving the transport robot 30 between the first flooring 17 of the lifting space 41 and the second flooring 18 of the staircase hall 23. However, in such a case, the moving mechanism may have an extremely complicated configuration. Meanwhile, in the configuration where the transport robot 30 moves using the extension function of the transport robot 30 and the moving mechanism 50, the transport robot 30 can move between the first flooring 17 and the second flooring 18 and the moving mechanism 50 does not have to have a complicated configuration.

Since the transport robot 30 moves up and down between the first floor 11 and the second floor 12 in the lifting space 41 using the extension function of the transport robot 30, it is not necessary to provide the lifting unit on the building 10, thus the building 10 can have a simplified configuration. Since it is not required to provide the lifting unit in the lifting space 41, the resident does not experience inconvenience due to the lifting unit when they pass through the lifting space 41.

The moving mechanism 50 is attached to the lower surface 45b of the storage 45 protruding toward the lifting space 41 above the spandrel wall 43. Accordingly, the moving mechanism 50 can be stably mounted owing to the storage 45, and can be appropriately hidden behind the storage 45.

The transport robot 30 is supported by hooking the pair of arms 52 on the flange portion 32a of the mounting portion 32 of the transport robot 30. Specifically, the transport robot 30 is supported by hooking the pair of arms 52 on the portions of the flange portion 32a of the mounting portion 32, respectively, which protrude on both sides of the pillar 35. Since the transport robot 30 is supported from both sides by the pair of arms 52, the transport robot 30 can be stably supported. In the configuration in which the transport robot 30 is supported by the pair of arms 52 and hooked on the specific structures, the transport robot 30 can be stably supported even if the position of the transport robot 30 varies slightly as compared to a configuration in which, for example, the transport robot 30 is sandwiched and supported by the pair of arms 52. Therefore, it is possible to stably and firmly support the transport robot 30.

Since the arms 52 are hooked on the flange portion 32a of the mounting portion 32 to support the transport robot 30, the mounting portion 32 can be used not only for mounting the object but also as the portion on which the arms 52 are hooked.

The first floor 11 has the hallway 21 provided adjacent to the lifting space 41, and the second floor 12 has the staircase hall 23 provided adjacent to the lifting space 41. Since both the hallway 21 and the staircase hall 23 are non-living spaces, the resident does not experience much inconvenience when the transport robot 30 moves using the moving mechanism 50, as compared to a case where the living room is provided adjacent to the lifting space 41.

The present disclosure is not limited to the embodiment stated above, and may be implemented, for example, as follows.

Figure 9A:
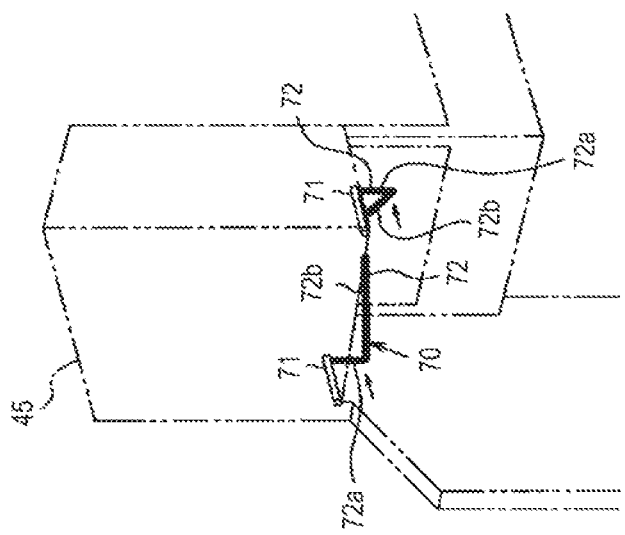
FIG. 9A is a perspective view illustrating another example of the moving mechanism and a case where the arms of the moving mechanism are in a first position.
Figure 9B:
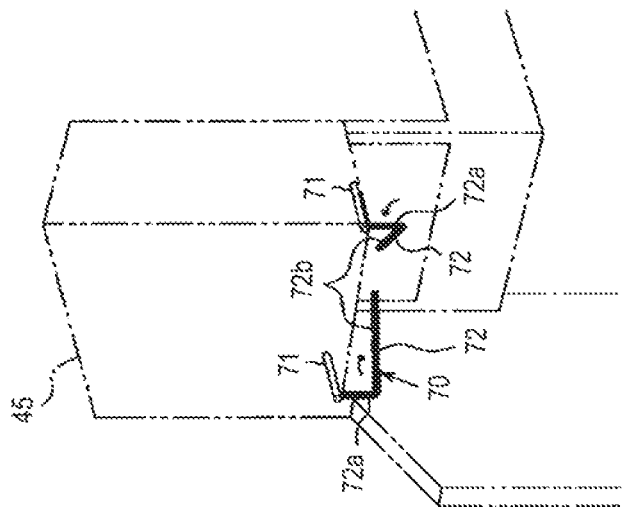
FIG. 9B is a perspective view illustrating another example of the moving mechanism and a case where the arms are in a second position.
Figure 9C:
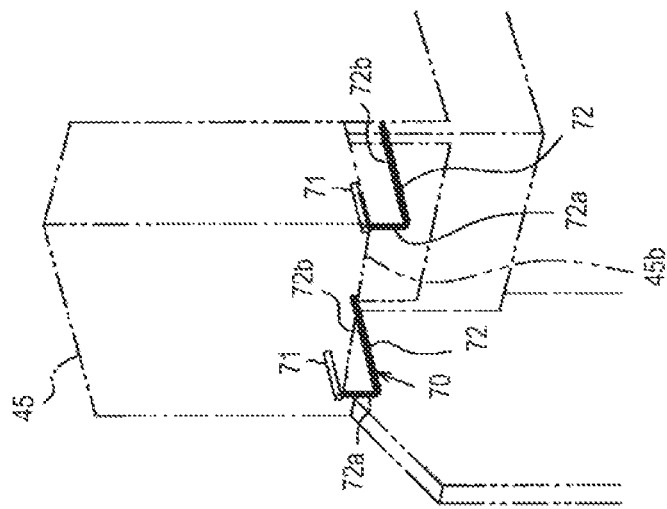
FIG. 9C is a perspective view illustrating another example of the moving mechanism and a case where the arms are in a third position.

(1) FIGS. 9A, 9B and 9C illustrate a modified example of the moving mechanism. A moving mechanism 70 illustrated in FIGS. 9A, 9B and 9C includes a pair of guide rails 71 and a pair of arms 72, as in the moving mechanism 50 of the embodiment stated above. The guide rails 71 extend parallel to each other in the opening direction of the opening 47. Each arm 72 is formed in an L-shape having an attachment portion 72a and a supporting portion 72b, similar to the arm 52 of the embodiment stated above. The arms 72 are movable along the guide rails 71, and rotatable about the attachment portion 72a extending in the vertical direction.

FIG. 9A illustrates a case where the arms 72 are in the first position, FIG. 9B illustrates a case where the arms 72 are in the second position, and FIG. 9C illustrates a case where the arms 72 are in the third position. As illustrated in FIG. 9A, in a case where the arms 72 are in the first position, the supporting portions 72b of the arms 72 extend parallel to each other in the opening direction of the opening 47. In this case, the arms 72 are spaced apart.

As illustrated in FIG. 9B, when the arms 72 move from the first position to the second position, each arm 72 rotates inward about the attachment portion 72a. That is, each arm 72 rotates such that the supporting portions 72b of the arms 72 approach each other. In a case where the arms 72 are located at the second position, the arms 72 are close to each other, that is, they are closer to each other as compared to a case where the arms are spaced apart. Accordingly, in the moving mechanism 70 also, the arms 72 are spaced apart or are close to each other due to moving the arms 72 between the first position and the second position. Therefore, the arms 72 can support or release supporting of the flange portion 32a of the mounting portion 32, and further, the transport robot 30 is supported by the arms 72.

As illustrated in FIG. 9C, when the arms 72 move from the second position to the third position, the arms 72 move in parallel along the guide rails 71. Therefore, the arms 72 move between the second position and the third position while they stay close to each other. Accordingly, the moving mechanism 70 of this example also enables the transport robot 30 supported by the arms 72 to move between the lifting space 41 and the staircase hall 23 via the opening 47, by moving the arms 72 between the second position and the third position.

(2) In the embodiment stated above, the transport robot 30 is supported by the arms 52, but the transport robot 30 may be sandwiched and supported by the arms. For example, it may be configured that the transport robot 30 is supported by sandwiching the pillar 35 of the transport robot 30 with the arms.

(3) In the embodiment stated above, the building 10 is provided with the storage 45 as the overhang portion, but a desk or a stand may serve as the overhang portion.

Also in this case, the moving mechanism 50 may be attached to the lower surface of the overhang portion.

(4) In the building 10 of the embodiment stated above, the spandrel wall 43 is provided between the staircase hall 23 and the lifting space 41, and the storage 45 is provided above the spandrel wall 43. However, depending on a building, a division wall (corresponding to the partition wall) may be provided, which extends vertically from the floor surface of the staircase hall 23 over a top surface between the staircase hall 23 and the lifting space 41, and the overhand portion such as the storage may not be provided. In such a building, an opening for moving the transport robot 30 may be provided in the division wall, and the moving mechanism may be attached to a surface of the division wall on the side of the lifting space 41. The moving mechanism may be arranged so as to protrude from the division wall toward the lifting space 41.

(5) In the embodiment stated above, the transport robot 30 is configured to move up and down between the first floor 11 and the second floor 12 in the lifting space 41 using its own extension function. However, a lifting unit may be provided in the lifting space 41 on the building 10 for moving the transport robot 30 up and down between the first floor 11 and the second floor 12. In this case, the transport robot may not have the extension function.

Examples of such a lifting unit include a rod-shaped body, such as a pole extending vertically across the first floor 11 and the second floor 12 in the lifting space 41. In this case, the transport robot may be configured to autonomously travel along the rod-shaped body in the vertical direction, by which the transport robot can move up and down between the first floor 11 and the second floor 12 in the lifting space 41, as in the embodiments disclosed in JP 2008-262261 A.

In such a configuration, when the transport robot rises from the first floor 11 to the second floor 12 along the rod-shaped body in the lifting space 41, the transport robot is supported by the arms 52, and the transport robot moves from the lifting space 41 to the staircase hall 23 while it is supported by the arms. Further, when the transport robot moves from the staircase hall 23 to the lifting space 41 while it is supported by the arms 52, the transport robot is supported by the rod-shaped body, and is released from being supported by the arms 52. The transport robot then descends from the second floor 12 to the first floor 11 along the rod-shaped body.

Furthermore, a lifting stand may be provided to be movable between the floor surface of the first flooring 17 and the second floor 12 in the lifting space 41, as the lifting unit. In this case, the lifting stand moves up and down while the transport robot is placed thereon, thus the transport robot moves up and down between the first floor 11 and the second floor 12 in the lifting space 41.

(6) In the embodiment stated above, the moving mechanism 50 is provided for moving the transport robot 30 between the lifting space 41 and the staircase hall 23 on the second floor 12. However, a transfer device may be provided for directly moving the transport robot 30 between the first flooring 17 in the lifting space 41 and the staircase hall 23. In this case, the transfer device enables the transport robot to move up and down between the first floor 11 and the second floor 12 in the lifting space 41, and move between the lifting space 41 and the staircase hall 23 on the second floor 12. Such a transfer device may be configured, for example, to have arms for supporting the transport robot and guide rails for guiding the arms, similar to the moving mechanism 50 of the embodiment stated above.

(7) In the embodiment stated above, the swinging door 48 is provided to open and close the opening 47. However, the opening 47 may be left open at all times without the swinging door 48. In such a case, the opening drive unit 49 may not be provided as the swinging door 48 is omitted, and thus the configuration can be simplified. However, in this case, objects may fall through the opening 47. Thus it is desirable to provide the swinging door 48 in view of safety.

(8) For example, in a case where the transport robot 30 is not planned to be adopted in the building 10 when the building 10 is newly constructed but will be introduced in the future, the moving mechanism 50 may be attached to the storage 45 in advance when the building 10 is constructed. In this case, when the transport robot 30 is introduced, it is only necessary to form the opening 47 in the spandrel wall 43, and thus the transport robot 30 can be adopted easily without much additional work.

(9) The configuration of the transport robot 30 is not necessarily limited to that of the embodiment stated above. For example, the transport robot 30 may be provided with a movable arm, and may grab the object to be transported by the arm and place it on the mounting portion 32 all by itself.

(10) In the embodiment stated above, the transport robot 30 for transporting the objects is provided in the building 10 as the traveling object. However, other robots may be adopted as the traveling object, such as a cleaning robot for cleaning inside the building 10. For example, in a case where the cleaning robot is installed in the building 10, the cleaning robot is not provided with the mounting portion 32 (flange portion 32a), thus the cleaning robot is required to be configured to have a pair of protrusions, laterally projecting to opposite sides of each other, whereby the cleaning robot is hooked on the protrusions and is supported by the pair of arms 52.

(11) In the embodiment stated above, the upper floor-adjacent space connecting to the lifting space 41 via the opening 47 on the second floor 12 is the staircase hall 23. However, the upper floor-adjacent space does not have to be the staircase hall 23, and may be, for example, the living room. In the embodiment stated above the space connecting to the lifting space 41 on the first floor 11 is the hallway 21, but may be, for example, the living room.

Figure 10:
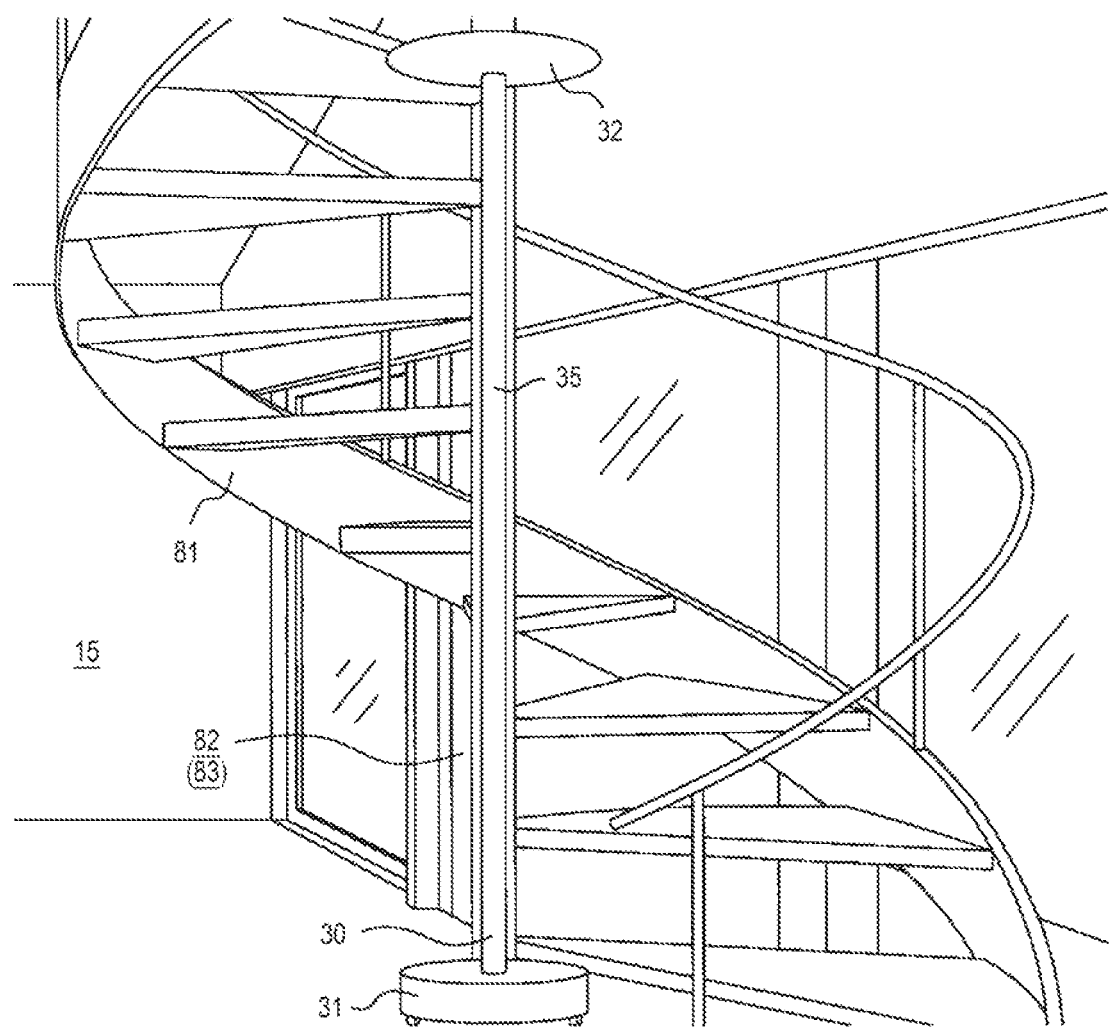
FIG. 10 is a perspective view illustrating an extended state of the transport robot in the staircase area provided with a spiral staircase.

(12) In the embodiment stated above, the staircase area 15 is provided with the winder staircase as the staircase 16, but as illustrated in FIG. 10, for example, a spiral staircase 81 may be provided. The present disclosure may be applied in such a case. In the example of FIG. 10, a space 82 extending in the vertical direction is present inside the spiral staircase 81 in a plan view. This space 82 constitutes a part of the non-installation space where the spiral staircase 81 is not installed in the staircase area 15. Therefore, the space 82 may be used as a lifting space 83 of the transport robot 30.

(13) In the embodiment stated above, the present disclosure is applied to a two-story building 10, but the present disclosure may be adopted for a three-story building or a building higher than that. Also in this case, the present disclosure can be applied when the transport robot 30 moves between the lower floor and the upper floor, which are adjacent to each other in the vertical direction.

What is claimed is:

1. A building comprising:
   a lower floor,
   an upper floor adjacent to the lower floor in a vertical direction,
   a staircase area in which a staircase connecting the lower floor and the upper floor is installed, the staircase area being provided across the lower floor and the upper floor,
   a traveling object configured to travel on each of the lower floor and the upper floor, the traveling object including a lifting unit, and
   a moving mechanism including a pair of movable arms, wherein:
   a lifting space is provided where the staircase is not installed, in the staircase area;
   the upper floor is provided with an upper floor-adjacent space adjacent to the lifting space between which a partition wall exists;
   an opening is provided in the partition wall;
   the traveling object is configured to move up and down between the lower floor and the upper floor within the lifting space by the lifting unit;
   the pair of movable arms is configured to support the traveling object and release supporting of the traveling object on the upper floor in the lifting space;
   the moving mechanism is configured to move the traveling object through the opening between the lifting space and the upper floor-adjacent space by operating the pair of movable arms while the pair of movable arms supports the traveling object;
   an overhang portion is provided above the opening, to be closer to the lifting space than the partition wall; and
   the moving mechanism is mounted on a lower surface of the overhang portion.

2. The building according to claim 1, wherein the lifting unit is configured to be extendable in the vertical direction and move up and down between the lower floor and the upper floor as the lifting unit extends and contracts.

3. The building according to claim 1, wherein:
   the traveling object includes a pair of protrusions, laterally projecting to opposite sides of each other;
   the pair of movable arms is configured to support the traveling object by respectively being hooked on the protrusions of the traveling object; and
   the arms are configured to approach each other to be respectively hooked on the protrusions such that the arms support the traveling object, and separate from each other to release from the protrusion such that the arms release supporting of the traveling object.

4. The building according to claim 3, wherein:
   the traveling object is a transport robot configured to transport an object;
   the transport robot includes a main body configured to travel on the floor, a mounting portion that is provided above the main body and on which the object is placed, and a pillar configured to connect the main body and the mounting portion;
   the pillar is configured to be extendable in the vertical direction;
   the transport robot includes the lifting unit configured to move up and down between the lower floor and the upper floor as the pillar extends and contracts;
   the mounting portion protrudes on both sides of the pillar; and
   protruding portions of the mounting portion respectively correspond to the protrusions on which the arms are hooked.

* * * * *